United States Patent
Juels et al.

(10) Patent No.: US 8,994,514 B1
(45) Date of Patent: Mar. 31, 2015

(54) EVENT INDICATOR CREATION USING FIRST AND SECOND SETS OF VALUES

(71) Applicants: EMC Corporation, Hopkinton, MA (US); ETH Zurich, Zurich (CH)

(72) Inventors: Ari Juels, Brookline, MA (US); Srdan Capkun, Zurich (CH); Davide Zanetti, Zurich (CH)

(73) Assignee: EMC Corporation, Hopkinton, MA (US)

( * ) Notice: Subject to any disclaimer, the term of this patent is extended or adjusted under 35 U.S.C. 154(b) by 209 days.

(21) Appl. No.: 13/720,003

(22) Filed: Dec. 19, 2012

(51) Int. Cl.
*H04Q 5/22* (2006.01)
*G06K 7/01* (2006.01)

(52) U.S. Cl.
CPC ........................... *G06K 7/01* (2013.01)
USPC ................... 340/10.51; 340/10.52; 340/10.41

(58) Field of Classification Search
CPC ............. G05B 2219/1113; G05B 2219/13129; G05B 2219/31287; G05B 2219/31312; G05B 2219/36371; G05B 19/056; G05B 19/4183; G06Q 20/20; G06Q 30/0255; G06Q 30/0268; G06Q 30/0269; G07G 1/0045; G08B 13/2417; G08B 13/2462; G08B 13/2471; H04Q 2209/47; G06K 19/0723; G06K 1/18; G06K 19/0701; G06K 2017/0045; G06K 5/00; G06K 7/10118; G06K 7/10346; G06K 7/10861; G06K 7/1095
USPC .................. 340/10.51, 10.52, 10.41
See application file for complete search history.

(56) References Cited

U.S. PATENT DOCUMENTS

| | | | | |
|---|---|---|---|---|
| 6,266,525 | B1 * | 7/2001 | Peterson | 455/410 |
| 2003/0234718 | A1 * | 12/2003 | Fujisawa et al. | 340/5.1 |
| 2005/0280507 | A1 * | 12/2005 | Diorio et al. | 340/10.1 |
| 2006/0022799 | A1 * | 2/2006 | Juels | 340/10.1 |
| 2007/0194879 | A1 * | 8/2007 | Backes et al. | 340/5.8 |
| 2010/0148935 | A1 * | 6/2010 | Graf Von Reischach et al. | 340/10.5 |
| 2010/0289627 | A1 * | 11/2010 | McAllister et al. | 340/10.42 |
| 2011/0248827 | A1 * | 10/2011 | Bertoncini et al. | 340/10.1 |

OTHER PUBLICATIONS

T.K. Mackey et al., "The Global Counterfeit Drug Trade: Patient Safety and Public Health Risks," Journal of Pharmaceutical Sciences, Nov. 2011, pp. 4571-4579, vol. 100, No. 11.
EPCglobal, "EPC Information Services (EPCIS) Version 1.0.1 Specification," EPCglobal Inc., Sep. 2007, 146 pages.
EPCglobal, "EPCTM Radio-Frequency Identity Protocols Class-1 Generation-2 UHF RFID Protocol for Communications at 860 MHz-960 MHz, Version 1.2.0," EPCglobal Inc., Oct. 2008, 108 pages.

(Continued)

*Primary Examiner* — Jennifer Mehmood
*Assistant Examiner* — Emily C Terrell
(74) *Attorney, Agent, or Firm* — Ryan, Mason & Lewis, LLP

(57) ABSTRACT

An apparatus comprises a transceiver, a memory and a processor coupled to the memory. The processor is configured to obtain an identifier and a first set of values from a device via the transceiver, to determine a second set of values, the second set of values being based at least in part on the first set of values and a probabilistic function, to transmit the second set of values to the device via the transceiver, and to create an event indicator associated with the identifier in the memory, the event indicator comprising at least a portion of the first set of values.

25 Claims, 8 Drawing Sheets

(56) References Cited

OTHER PUBLICATIONS

K. Koscher et al., "EPC RFID Tag Security Weaknesses and Defenses: Passport Cards, Enhanced Drivers Licenses, and Beyond," ACM Conference on Computer and Communications Security (CCS), Nov. 2009, pp. 33-42.
F. Gandino et al., "Tampering in RFID: A Survey on Risks and Defenses," Mobile Networks and Applications, Aug. 2010, pp. 502-516, vol. 15, No. 4.
Y. Oren et al., "Remote Password Extraction From RFID Tags," IEEE Transactions on Computers, Sep. 2007, pp. 1292-1296, vol. 56, No. 9.
M. Lehtonen et al., "Securing RFID Systems by Detecting Tag Cloning," 7th International Conference on Pervasive Computing, May 2009, pp. 291-308, Nara, Japan.
D. Zanetti et al., "Privacy-Preserving Clone Detection for RFID-Enabled Supply Chains," IEEE International Conference on RFID, Apr. 2010, pp. 37-44.
IMPINJ, "Monza 5 UHF Gen 2 RFID Tag Chip," http://www.impinj.com/, 2012, 2 pages.
R. Koh et al., "Securing the Pharmaceutical Supply Chain," Auto-ID Center, White Paper, Jun. 2003, 19 pages.
T. Staake et al., "Extending the EPC Network—The Potential of RFID in Anti-Counterfeiting," ACM Symposium on Applied Computing (SAC), Mar. 2005, pp. 1607-1612.
L. Mirowski et al., "Deckard: A System to Detect Change of RFID Tag Ownership," International Journal of Computer Science and Network Security (IJCSNS), Jul. 2007, pp. 89-98, vol. 7, No. 7.
M. Lehtonen et al., "Probabilistic Approach for Location-Based Authentication," 1st International Workshop on Security for Spontaneous Interaction (IWSSI), Sep. 2007, 6 pages.
M. Lehtonen et al., "How to Detect Cloned Tags in a Reliable Way from Incomplete RFID Traces," IEEE International Conference on RFID, Apr. 2009, pp. 257-264.
F. Kerschbaum et al., "Privacy-Preserving Pattern Matching for Anomaly Detection in RFID Anti-Counterfeiting," 6th International Workshop on Radio Frequency Identification: Security and Privacy Issues (RFIDSec), Jun. 2010, pp. 124-137, Istanbul, Turkey.
E.-O. Blass et al., "Tracker: Security and Privacy for RFID-Based Supply Chains," Proceedings of the Network and Distributed System Security Symposium (NDSS), Feb. 2011, 17 pages.
K. Elkhiyaoui et al., "CHECKER: On-Site Checking in RFID-Based Supply Chains," 5th ACM Conference on Security and Privacy in Wireless and Mobile Networks (WISEC), Apr. 2012, pp. 173-184.
S.C.G. Periaswamy et al., "Fingerprinting RFID Tags," IEEE Transactions on Dependable and Secure Computing (TDSC), Nov.-Dec. 2011, pp. 938-843, vol. 8, No. 6.
D. Zanetti et al., "Physical-Layer Identification of UHF RFID Tags," ACM 16th Annual International Conference on Mobile Computing and Networking (MobiCom), Sep. 2010, pp. 353-364.
H.-Y. Chien et al., "Mutual Authentication Protocol for RFID Conforming to EPC Class 1 Generation 2 Standards," Computer Standards & Interfaces, Feb. 2007, pp. 254-259, vol. 29, No. 2.
D.M. Konidala et al., "A Simple and Cost-Effective RFID Tag-Reader Mutual Authentication Scheme," International Conference on RFID Security (RFIDSec), Jul. 2007, pp. 141-152.
C.-L. Chen et al., "Conformation of EPC Class 1 Generation 2 Standards RFID System with Mutual Authentication and Privacy Protection," Engineering Applications of Artificial Intelligence, Dec. 2009, pp. 1284-1291, vol. 22, No. 8.
P. Peris-Lopez et al., "Vulnerability Analysis of a Mutual Authentication Scheme Under the EPC Class-1 Generation-2 Standard," Proceedings of the Workshop on RFID Security (RFIDSec), Jul. 2008, 12 pages.
P. Peris-Lopez et al., "Cryptanalysis of an EPC Class-1 Generation-2 Standard Compliant Authentication Protocol," Engineering Applications of Artificial Intelligence, Sep. 2011, pp. 1061-1069, vol. 24, No. 6.
J. Melià-Segui et al., "A Practical Implementation Attack on Weak Pseudorandom Number Generator Designs for EPC Gen2 Tags," Wireless Personal Communications, Jul. 2011, pp. 27-42, vol. 59, No. 1.
Ari Juels, "Strengthening EPC Tags Against Cloning," ACM Workshop on Wireless Security (WISe), Sep. 2005, pp. 67-76, Cologne, Germany.
B. Gassend et al., "Silicon Physical Random Functions," 9th ACM Conference on Computer and Communications Security (CCS), Nov. 2002, pp. 148-160.
P. Tuyls et al., "RFID-Tags for Anti-Counterfeiting," The Cryptographers' Track at the RSA Conference, Topics in Cryptology—CT-RSA, Feb. 2006, pp. 115-131.
S. Devadas et al., "Design and Implementation of PUF-Based "Unclonable" RFID ICs for Anti-Counterfeiting and Security Applications," IEEE International Conference on RFID, Apr. 2008, pp. 58-64.
L. Kulseng et al., "Lightweight Mutual Authentication and Ownership Transfer for RFID Systems," IEEE International Conference on Computer Communications (INFOCOM), Mar. 2010, pp. 1-5.
U. Rührmair et al., "Modeling Attacks on Physical Unclonable Functions," ACM Conference on Computer and Communications Security (CCS), Oct. 2010, 13 pages.
Information Security Group, "RFID Security & Privacy Lounge," http://www.avoine.net/rfid/index.php, Aug. 2011, 4 pages.
Mathieu David, "Lightweight Cryptography for Passive RFID Tags," Ph.D. Thesis, Aalborg University, Dec. 2011, 148 pages.
D. Hein et al., "ECC is Ready for RFID—A Proof in Silicon," 15th International Workshop on Selected Areas in Cryptography (SAC), Aug. 2009, pp. 401-413, Sackville, New Brunswick, Canada.
S.C. Bono et al., "Security Analysis of a Cryptographically-Enabled RFID Device," 14th USENIX Security Symposium (SSYM), Aug. 2005, pp. 1-16, vol. 14.
T.S. Heydt-Benjamin et al., "Vulnerabilities in First-Generation RFID-Enabled Credit Cards," 11th International Conference on Financial Cryptography and Data Security (FC) and 1st International Workshop on Usable Security (USEC), Feb. 2007, pp. 2-14, Scarborough, Trinidad and Tobago.

\* cited by examiner

EVENT INDICATOR CREATION USING FIRST AND SECOND SETS OF VALUES

FIELD

The present invention relates generally to device tracking, and more particularly to identifying counterfeits through device tracking.

BACKGROUND

Radio frequency identification (RFID) tags are inexpensive wireless microchips used to identify physical objects. RFID tags are present in a variety of physical objects, including passports, drivers' licenses, shipping cases, clothing, payment cards, etc. A major driver of the deployment of RFD systems is to prevent and detect counterfeiting, or the introduction of fake goods into a supply chain. By affixing RFID tags directly to goods or the cases in which they are transported, supply chain partners can automatically track goods in transit, facilitating the detection of counterfeit goods. RFID tags typically emit unique identifiers. A supply chain partner can in principle confirm an object's authenticity by checking its serial number against a shipping manifest or with a directory service spanning supply chain partners. Electronic Product Code (EPC) Information Services (EPCIS) is one example of such a directory service. Counterfeit detection is of vital importance to many industries in which counterfeit goods cause large profit losses. In some industries, such as the pharmaceutical industry, counterfeit goods may also lead to patient deaths.

SUMMARY

Illustrative embodiments of the present invention provide techniques for creating event indicators using first and second sets of values. Such techniques may be used, for example, in device tracking.

In one embodiment, an apparatus comprises a transceiver, a memory and a processor coupled to the memory. The processor is configured to obtain an identifier and a first set of values from a device via the transceiver, to determine a second set of values, the second set of values being based at least in part on the first set of values and a probabilistic function, to transmit the second set of values to the device via the transceiver, and to create an event indicator associated with the identifier in the memory, the event indicator comprising at least a portion of the first set of values.

In another embodiment, an apparatus comprises interface circuitry, a memory and a processor coupled to the memory. The processor is configured to store an identifier and a first set of values in the memory, to receive a second set of values from a reader, and to write the second set of values to the memory. The second set of values is determined based at least in part on the first set of values and a probabilistic function. At least a portion of the first set of values is used to create an event indicator associated with the identifier.

Advantageously, one or more of the illustrative embodiments disclosed herein provide simple and efficient techniques for tracking devices in order to detect counterfeit devices and products.

These and other features and advantages of embodiments of the present invention will become more readily apparent from the accompanying drawings and the following detailed description.

DETAILED DESCRIPTION

Embodiments of the invention will be described herein with reference to an exemplary RFID system in which multiple RFID devices communicate with an RFID device reader. It is to be appreciated, however, that the invention is not restricted to use in this or any other particular RFID system configuration. In addition, embodiments of the invention may be implemented in non-RFID systems.

The term "RFID device" as used herein is intended to include an RFID tag or any other type of device configurable for transmission of device-identifying information via radio frequency communications. Although the following description will refer primarily to EPC tags, it is to be understood that the techniques disclosed are applicable to other types of RFID tags, and more generally applicable to other types of RFID devices. Also, the terms "radio frequency" or "RE" as used herein are not intended to be restricted to any particular frequency range, but are instead intended to be construed more generally so as to encompass any contiguous or non-contiguous arrangement of one or more signal frequencies suitable for supporting wireless communication between at least one device and at least one reader.

The term "identifier" as used herein is intended to be construed broadly as a string, set of numbers, code, etc. which may be used to identify a particular RFID tag or other device. The device-identifying information associated with a given RFID device may be an EPC, a serial number or any other type of identifier. It should be noted that not every identifier in a given set of unique identifiers need have a corresponding realized device.

The term "reader" as used herein is intended to include any type of device capable of interacting with an RFID tag or other device so as to receive device-identifying information therefrom.

Figure 1:
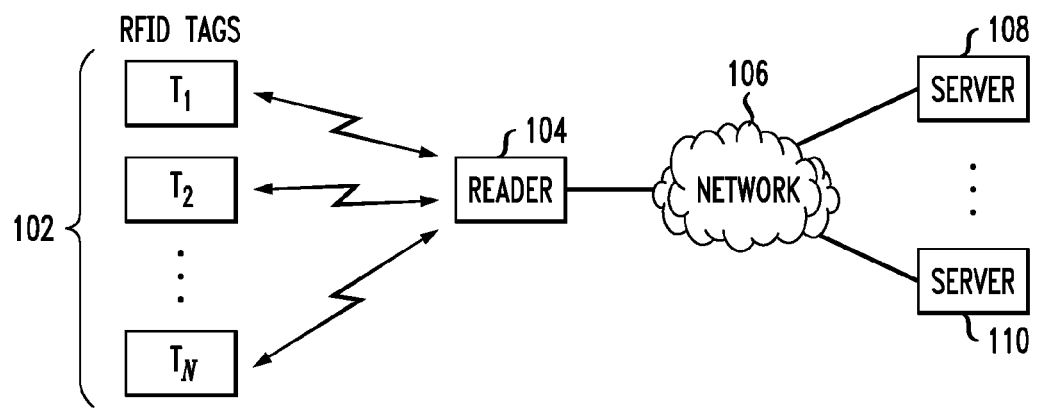
FIG. 1 is a simplified block diagram of an exemplary RFID system in which embodiments of the present invention may be implemented.

FIG. 1 shows an RFID system 100 in which embodiments of the invention are implemented. The system 100 includes a number N of RFID tags 102, more particularly denoted by their associated tag identifiers $T_1, T_2, \ldots T_N$, and an RFID reader 104. The reader 104 communicates with the tags 102 and receives information therefrom, which may include an identifier, one or more values or sets of values, etc. The reader 104 is coupled via a network 106 to servers denoted 108, 110.

Although not explicitly shown in FIG. 1, a verifier may be associated with the reader 104. Such a verifier or detector may be implemented, for example, using one or both of the servers 108, 110, another network element accessible via the network 106, or another system element coupled to or otherwise associated with the reader 104.

A given RFID tag 102 in accordance with the invention generally includes circuitry comprising memory, processing logic and an RF transceiver. These elements may be configured in a manner similar to that used in conventional RFID tags. One or more of the tags 102 may also or alternatively implement minimalist cryptography, soft blocking, or other techniques. Embodiments of the invention, however, do not require the use of such cryptographic techniques.

The network 106 may represent a global computer network such as the Internet, a wide area network (WAN), a local area network (LAN), a satellite network, a telephone or cable network, or various portions or combinations of these and other types of networks. The servers 108, 110 may be conventional processor-based information processing devices of a type conventionally utilized in conjunction with RFID readers in an RFID system.

The particular number N of tags 102 in the system 100 is purely arbitrary, and the system can be configured to support any desired number of tags. Also, although only a single reader 104 is shown in the figure for simplicity and clarity of illustration, the system will typically include multiple readers. Furthermore, it should be noted that a given reader need not be connected to a network, and may instead operate as a stand-alone device, or may be only intermittently connected to the network. Also, a given reader can be directly connected to a server or other system element, rather than connected thereto over a network as illustrated in the example system 100.

Figure 2:
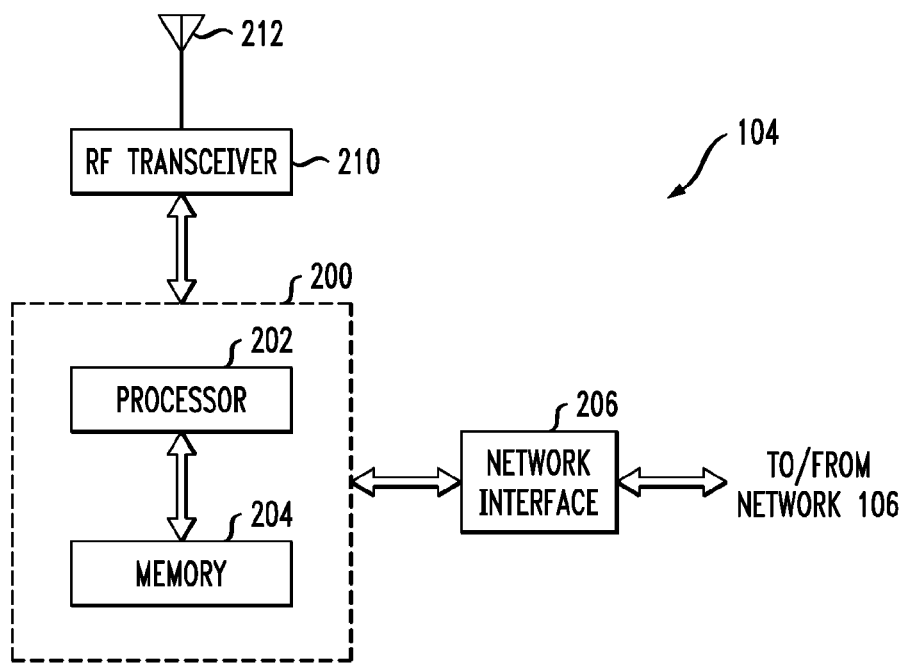
FIG. 2 illustrates an RFID device reader, according to an embodiment of the invention.

FIG. 2 shows one possible implementation of the reader 104 of the FIG. 1 system. The reader in this implementation includes a processing block 200, comprising a processor 202 coupled to a memory 204, a network interface 206, an RF transceiver 210, and an antenna 212. One or more of these elements may be implemented in whole or in part as a conventional microprocessor, digital signal processor, application-specific integrated circuit (ASIC) or other type of circuitry, as well as portions or combinations of such circuitry elements. Software programs for controlling the operation of the reader 104 may be stored in the memory 204 and executed by the processor 202. The memory 204, and other memories referred to herein, may comprise, for example, random access memory (RAM), read-only memory (ROM), electrically erasable programmable ROM (EEPROM), or other types of storage elements, in any combination.

Figure 3:
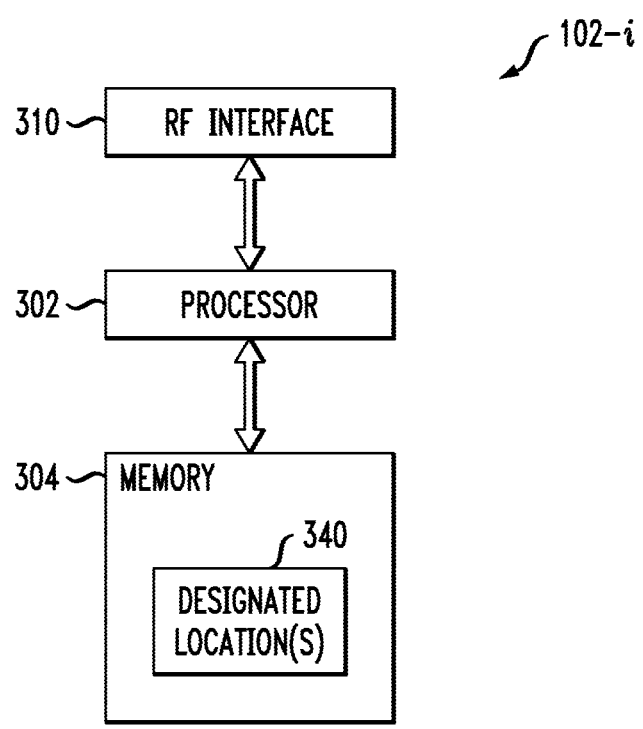
FIG. 3 illustrates an RFID device, according to an embodiment of the invention.

FIG. 3 shows one possible implementation of a given one of the RFID tags 102 of the FIG. 1 system. The tag comprises a processor 302 coupled to a memory 304, and an RF interface 310 which may comprise, for example, an RF transceiver and an associated antenna. The processor 302 may be in the form of relatively simple processing logic, or may represent a more complex processor. The processor 302 may implement a cryptographic module, which may comprise, for example, a one-time password generator or other processing element providing cryptographic functionality. The cryptographic module may comprise one or more software programs that are stored in memory 304 and executed by processor 302. The memory 304 comprises one or more designated locations 340, which may be accessible to both the tag 102 and to the reader 104. The reader 104 may be required to submit a PIN in order to access the designated locations 340, in accordance with the EPC Class-1 Gen-2 standard. The designated locations 340 may comprise substantially the entire memory of the tag 102, or just a designated subset of the tag memory. For example, the memory 304 may be organized in the form of multiple banks, with one or more of the banks being designated as accessible to the reader 104.

RFID counterfeit, detection is subject to two major challenges, cloning attacks and fragmentary supply chain visibility. Due to cost and power constraints, most RFID tags used in supply chains, such as EPC tags, have only "barcode"-like functionality. They emit raw data, with no cryptographic authentication. Thus their full data contents may be easily extracted and copied into a special-purpose clone device or another tag. Even RFID tags with cryptography generally offer minimally effective tamper resistance or side-channel protections.

RFID tags are generally passive devices that transmit data only to nearby readers. Their range is often limited to just tens of meters, and potentially further reduced by factors such as tag orientation, tag placement, and nearby materials (e.g., metal, water). Additionally, in supply chains, large populations of tags are often scanned in a short time (like a pallet of tagged goods passing through an RFID-enabled gate), causing read failures. Finally, some commercial partners cannot share supply chain information or do not do so for fear of disclosing sensitive business intelligence. Entire segments of a supply chain may be opaque to participating entities. Thus, real world supply chains often have large "blind zones," in which RFID tags scans do not happen or are not reported.

The challenges of cloning and fragmentary supply chain visibility undermine the effectiveness of unique identifiers in clone detection. As such, authentic identifiers do not ensure authentic tags or goods. Even natural detection strategies like looking for multiple, simultaneous appearances of the same tag identifier have limited effect. Blind zones can mask evidence of cloned tags or create inconsistencies in observed tag paths that lead to false alarms. Embodiments of the invention overcome these challenges through an approach referred to as "tailing."

Tailing in some embodiments involves writing random symbols into tags, creating in each tag a tail of values that evolves over time. Writing multiple symbols into the tags gradually randomizes the tails; this preserves symbol discrepancies over time, propagating them through blind zones. While passing through the supply chain, clones and authentic tags thus diverge in appearance, rendering clones more easily detectable. Tailing does not require the use of pre-defined correct or incorrect information based on supply chain structure or product flow, which would make it sensitive to shifts in supply chain dynamics. Instead, tailing relies on purpose-built evidence in the form of tails. Other types of tailing can be used in other embodiments.

Tailing, as will be described below, provides protection against successful clone injection, i.e., undetected passage of a clone through a supply chain, as well as protection against strong adversaries who can comprise many readers in a supply chain. The effectiveness of tailing against fragmentary visibility is also shown by analyzing the impact of blind zones and reader errors. In addition, tailing meets the resource requirements of ordinary, barcode-type RFIDs, such as EPC tags. Embodiments of tailing may be implemented which require only 8 bits of tag memory, and may scale with acceptable overhead in real-world supply chains.

Figure 4:
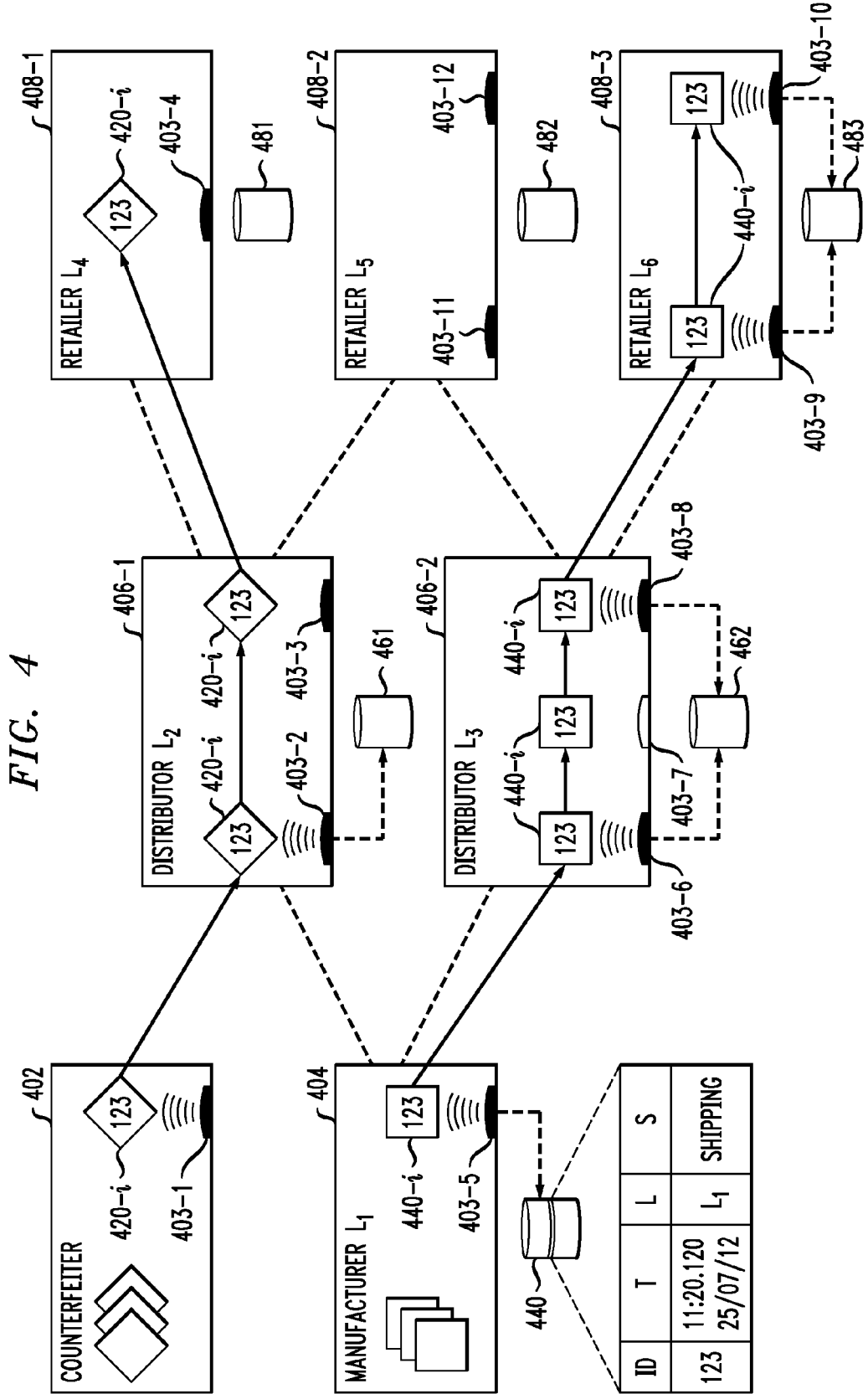
FIG. 4 illustrates an example of a supply chain, according to an embodiment of the invention.

FIG. 4 illustrates an example of an RFID-enabled supply chain. RFID-enabled supply chains are traditional supply chains enhanced such that each product (or palette or other group of products) is equipped with an RFID tag containing a unique identifier (ID). Supply chain partners, like manufacturer 404, distributors 406, and retailers 408 deploy RFID systems to create, store, and share observations of the tags/products circulating in the supply chain. An RFID system is typically composed of a front end, which includes RFID tags 440-*i* and readers 403, and a back end, which includes databases 440, 461, 462, 481, 482 and 483 along with service-oriented platforms like discovery and tracking services.

A product and its tag are considered to be a single, inseparable element 440-*i*. Tag hardware is constrained, since tags have limited memory and only basic functional capabilities. Tailing does not require cryptographic authentication between tags 440-*i* and readers 403. Tailing may thus be used in conjunction with the EPC C1G2 standard, a de facto RFID standard for supply chains. Tailing does not require writing to the tag ID, but does require writing to a tag memory by a reader 403.

On each tag observation by a reader 403, and event indicator is created and stored in a local database. For example, FIG. 4 shows reader 403-5 which reads from tag 440-*i*, and creates and stores an event indicator in local database 440. The event indicator may comprise various pieces of information regarding the event. For example, an event indicator may encapsulate information about the process S (e.g., receiving, stocking or shipping), occurrence time T, and location L in which a product/tag ID is sighted. Two special events are created when tags enter the supply chain (an into-the-chain event, created at the manufacturer when tags and IDs are assigned to products) and when tags leave the chain (an out-of-the-chain event, created at the retailer). Each supply chain partner is equipped with multiple RFID readers and local databases. Third party services may be authorized to access, aggregate, and analyze events from partners' local databases.

The term "misevent" as used herein refers to when an event is not reported. A misevent may occur because some entities or partners in the supply chain do not share data.

The term "misread" as used herein refers to when a tag passes unnoticed, i.e., when no events are created when a tag passes through a given location.

The term "miswrite" as used herein refers to when a tag write operation fails, which may corrupt the memory of a tag.

Event indicators caused by multiple reads of the same tag for a single event can be filtered out during data collection.

A counterfeiter 402 has the goal of injecting counterfeit goods 420-*i* into the supply chain without detection by any entity. A counterfeit product 420-*i* must be equipped with a tag in order to pass as genuine. In addition, the tag must bear a valid, unique ID associated with a genuine product. For example, reference may be made herein to a central detector, which is an entity which has a global view of tags/goods in the supply chain that can collect and correlate events from the local databases 440, 461, 462, 481, 482 and 483 of the supply chain partners.

Embodiments of the invention, however, do not require a central detector with a global view of the supply chain to detect counterfeit goods. For example, in embodiments of the invention a detector may only have information from a subset of the partners in the supply chain shown in FIG. 4. The detector is also affected by misevents, misreads and miswrites. The detector does not require any pre-defined information about the structure of the supply chain. For example, the detector does not require information regarding partner relationships, locations of each manufacturer 404, distributor 406 and retailer 408, etc. In addition, the detector does not require information regarding product flow through the supply chain, such as transportation times.

Tailing may be used in embodiments of the invention to prevent an adversary which controls a subset of readers from injecting counterfeit goods in a supply chain. An adversary may compromise a number of readers participating in clone detection, and control what information, if any, reaches a detector. An adversary can inject new products into the supply chain with RFID tags bearing data of its choice and, additionally, may know valid identifiers for all tags in the supply chain at any given time. A counterfeit product which carries a valid ID is also referred to herein as a clone.

Tailing may be further used to prevent an adversary with emulation (simulation of the presence of an RFID tag), blocking (preventing a compromised reader from scanning RFID tags) and tampering (altering the data contents of RFID tags) capabilities. In addition, tailing may be used to prevent an adversary with knowledge of the paths followed by products in a supply chain. Thus, tailing may also prevent an adversary with the capability of injection point selection and knowledge of both genuine and counterfeit good paths. An adversary, however, does not have the capability to read or modify data gathered by a detector (but may add data to a database via emulation). An adversary is also unable to modify the paths followed by genuine goods in a supply chain or modify product lead times. Product lead times refer to the times that products spend in the different steps of the supply chain (e.g., warehousing, transportation). The adversary may, however, learn the relative timestamps of the events for both genuine and counterfeit products. For example, the adversary may know that a first reader scans a genuine product before a second reader scans a corresponding counterfeit.

Tailing may be used in conjunction with a technique referred to as alert-list detection to detect counterfeits which enter a supply chain before a corresponding genuine product, or which remain in a supply chain after a genuine product exits the supply chain. Alert-list detection uses into-the-chain and out-of-the-chain events to detect such counterfeits.

Tailing relies on the creation and verification of event indicators in a tag trace. Supply chain partners, such as manufacturer 404, distributors 406 and retailers 408 in FIG. 4 can collaborate with one another and also with a detector to draw information from across the supply chain. Tailing, however, does not require every partner in a supply chain to participate in the creation and verification of event indicators.

Tailing first involves tail modification. A given tag 440-*i* has a memory which can store a sequence of random symbols that evolve over time. This sequence of random symbols may also be referred to herein as a set of values. The set of values, however, need not contain separate values, but may instead be a single value which is a concatenation of symbols. The set of values may alternatively comprise only a single value. Each reader 403 which participates in tailing modifies the tail of tag 440-*i* as it passes through the supply chain. Tail modification does not require interaction with the detector or other supply chain partners. Instead, tail modification requires only a reader and a tag.

To modify the tail of tag 440-*i*, a reader 403 refers to a stored value in the tag memory referred to herein as the tail pointer or pointer. The tail pointer indicates the most recently modified tail position or positions. A reader 403 then writes a piece of random data, a symbol, to the next available position in the tag memory and increments and writes a new tail pointer value to the memory of the tag 440-*i*. In addition, the reader 403 will create an event indicator. The event indicator, as described above, may include information such as the ID, T, L, and S attributes, as well as tag tail (TT) and tail pointer (TP) attributes. In some embodiments, the entire tag tail and/or tail pointer need not be in the event indicator. In some embodiments, the event indicator is stored in a local database such as 440, 461, 462, 481, 482 or 483 in FIG. 4. In other embodiments, the event indicator may be transmitted to a global database or other entity which collects and stores event indicators.

More precisely, to modify a tail, a reader 403 will read from a memory of the tag 440-$i$ the tag ID, tail and tail pointer, update the tail pointer and store the updated tail pointer in the memory of the tag 440-$i$, and pick a random symbol and insert it in the tail. Updating the tail pointer may involve a unitary increment, with wraparound. Insertion of the random symbol in the tag may comprise writing the random symbol to the next available position indicated by the pointer. Finally, the reader 403 will create an event indicator with all or some subset of the attributes ID, T, L, S, TT, TP and a tailing flag (TF). Reader 403 can signal non-participation in the tailing process by marking its events as unusable using TF.

A detector can verify whether a product is genuine by comparing event indicators. Only event indicators with valid TFs are used to build a tag trace. A detector can analyze the trace and evaluate the trace against a set of rules to find evidence of cloning. A pair of event indicators should reflect the results of valid tag modification operations. In particular, a pair of time-consecutive event indicators $e_i$ and $e_{i+1}$, having tail and tail pointer equal to $TT_i$ and $TP_i$, and to $TT_{i+1}$ and $TP_{i+1}$, respectively, is considered correct if the symbols in the tail $TT_{i+1}$ are the same as those in $TT_i$ (except in position $TP_{i+1}$) and the tail pointer $TP_{i+1}$ presents a unitary increment with respect to $TP_i$. In equation form, these rules are $$\begin{cases} TT_{i+1}[n] = TT_i[n] & \forall n/TP_{i+1} \\ TP_{i+1} - TP_i = 1 (\bmod t) \end{cases} \quad (1)$$

where n ranges from 1 to tail size t (in symbols) and TT[n] indicates the nth symbol in the tail TT. It is important to note that i in this context is not the same as the i used to denote tag 440-$i$ and counterfeit product 420-$i$. It is also important to note that in other embodiments of tailing, a non-unitary increment of the TP may be used. In addition, more than one symbol in TT may be written at each event. In addition, a tail pointer may specify one or more symbol positions or locations to be updated, which may be nonconsecutive locations.

In some embodiments, the symbol size is chosen as 1 bit. Likewise, in some embodiments the tail is chosen with a length of 5 symbols or less, as the benefits of tailing with a tail larger than 5 symbols generally does not outweigh the storage costs. Thus, embodiments of tailing require limited tag memory. Tags with an available memory space of 8 bits (5 bits for the tail and 3 bits for the tail pointer) may be used in embodiments of tailing. In other embodiments, however, where detection of counterfeit products is critical, it may be advantageous to have a tail length larger than 5 symbols.

Figure 5:
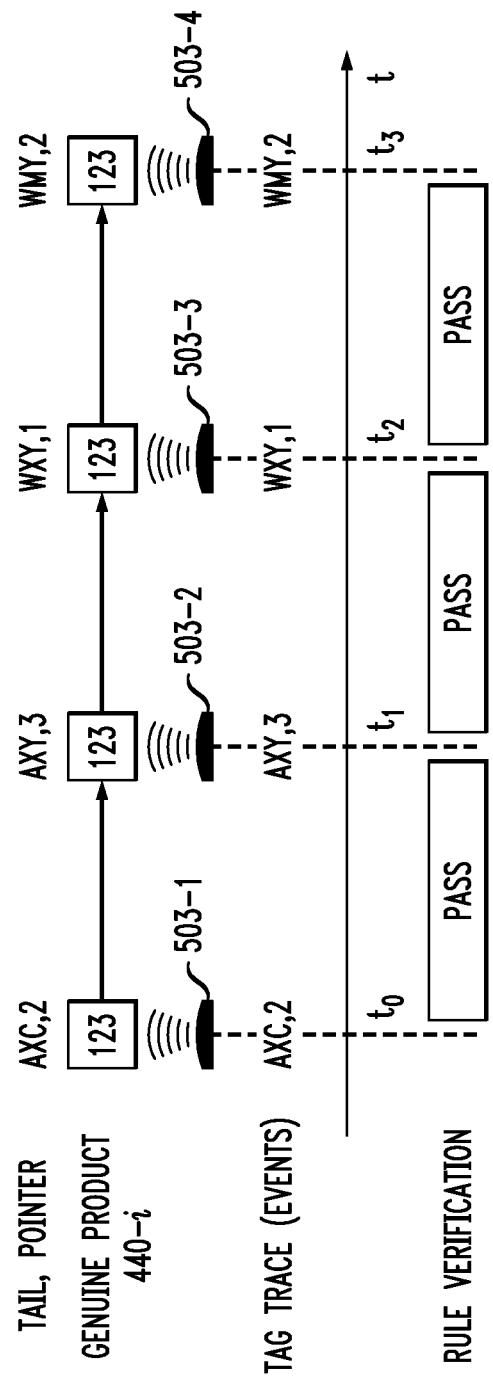
FIG. 5 illustrates a tag trace with a genuine product, according to an embodiment of the invention.

FIG. 5 illustrates a tag trace for a genuine product 440-$i$ as it circulates through a supply chain with readers 503-1, 503-2, 503-3 and 503-4 at times $t_0$, $t_1$, $t_2$ and $t_3$, respectively. In FIG. 5, that tag tail TT is three symbols long and the tail pointer TP is 1, 2 or 3. Reader 503-1 reads the TT AXC and TP 2 at time $t_0$, and directs the tag 440-$i$ to write a new TT AXY and increment the TP to 3. Reader 503-2 reads TT AXY and TP 3 at time $t_1$, and directs the tag 440-$i$ to write a new TT WXY and TP 1. Readers 503-3 and 503-4 similarly read the TT and TP from the tag 440-$i$ and direct the tag 440-$i$ to write new TTs and TPs. The tag trace satisfies the rules in Equation 1, and thus the tag 440-$i$ is verified at times $t_1$, $t_2$ and $t_3$.

Figure 6:
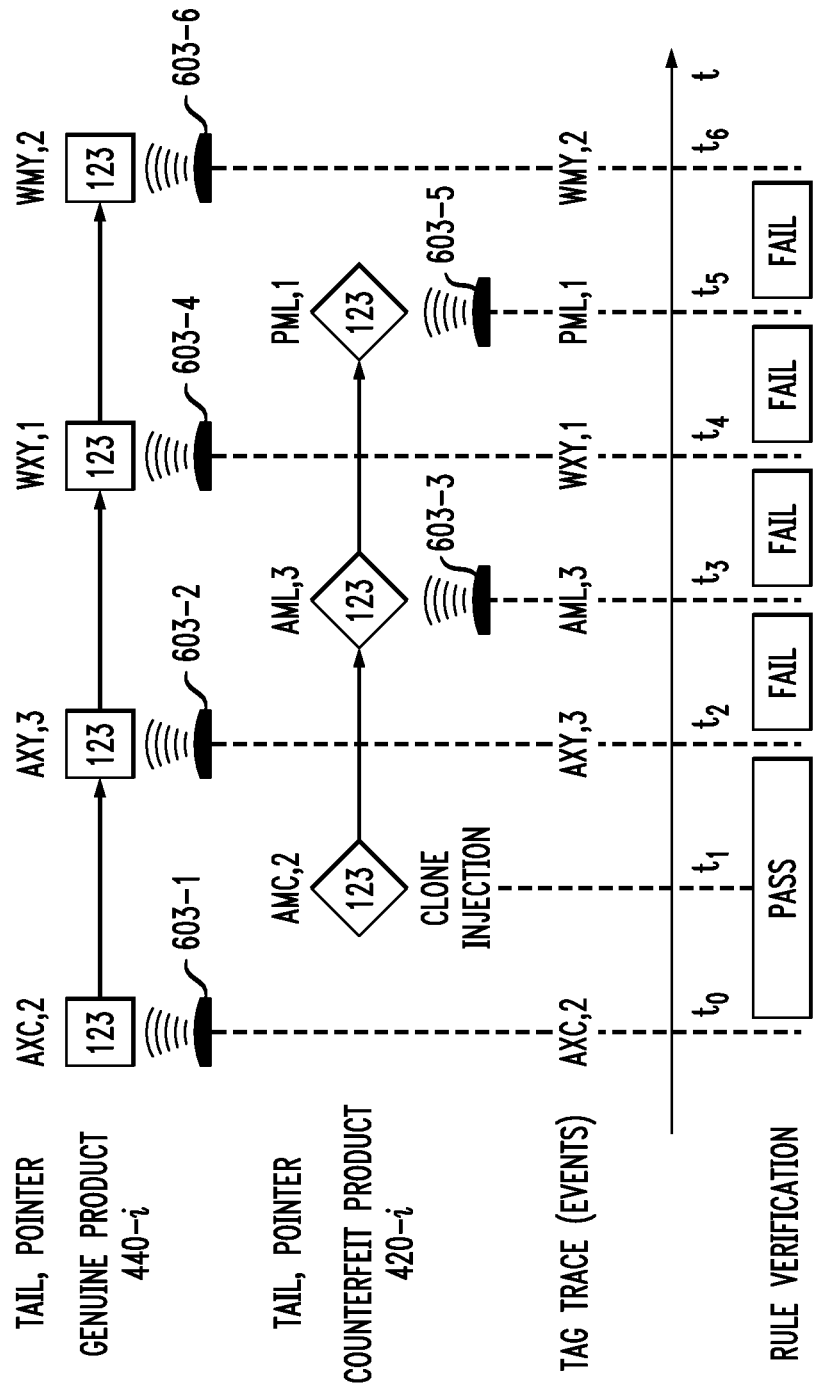
FIG. 6 illustrates a tag trace with a genuine product and a counterfeit product, according to an embodiment of the invention.

FIG. 6 illustrates a tag trace for a genuine product 440-$i$ and a counterfeit product 420-$i$ as they pass through a supply chain with readers 603-1, 603-2, 603-3, 603-4, 603-5 and 603-6 at times $t_0$, $t_1$, $t_2$, $t_3$, $t_4$, $t_5$, and $t_6$, respectively. Each reader 603 reads the TT and TP from the genuine product 440-$i$ or the counterfeit product 420-$i$ and directs the genuine product 440-$i$ or the counterfeit product 420-$i$ to write a new TT and TP. As shown in FIG. 6, the tag trace at times $t_2$, $t_3$, $t_4$, $t_5$, and $t_6$ does not satisfy the rules of equation 1, and thus tailing finds evidence of cloning.

Successful detection of cloning presents two main obstacles, false event consistency (i.e., the suppression or loss of clone evidence) and weak visibility (i.e., event streams that are fragmentary or error-prone). Continuously updating tails with random values makes it difficult for an adversary to guess tail contents. Even if the adversary knows a tail value at time $t_i$, at time $t_{i+j}$, there are j new symbols to guess. Additionally, updating the tail and incrementing the pointer in an ordered sequence builds a relationship between two time-consecutive events. Any extra adversarial event between two time-consecutive events will break this relationship, leading to clone detection.

Figure 7:
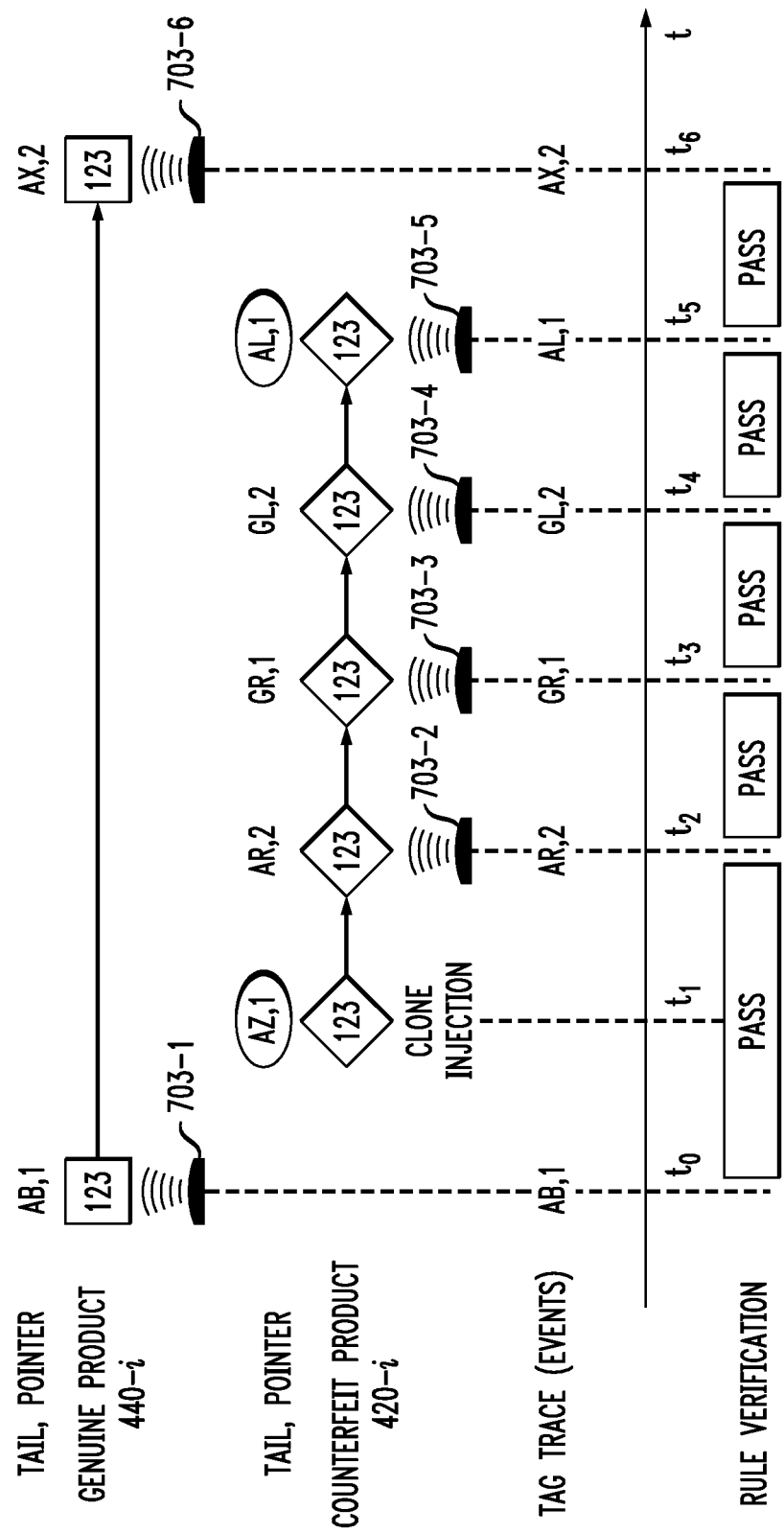
FIG. 7 illustrates another tag trace with a genuine product and a counterfeit product, according to an embodiment of the invention.

An adversary can nonetheless, with some probability, cancel out clone evidence. This is clearly possible when the adversary controls all the readers through which a counterfeit product (or the genuine one) passes. Even if the adversary has no control or partial control of readers, though, a chance remains that no clone evidence appears. FIG. 7 illustrates a tag trace for a genuine product 440-$i$ and a counterfeit product 420-$i$ as they pass through a supply chain with readers 703-1, 703-2, 703-3, 703-4, 703-5 and 703-6 at times $t_0$, $t_1$, $t_2$, $t_3$, $t_4$, $t_5$, and $t_6$, respectively. If the counterfeit tail and pointer are, by chance, consistent with the genuine tail and pointer at the injection time $t_1$ and at time $t_5$, no clone evidence would appear between events at times $t_0$ and $t_2$, and between events at times $t_5$ and $t_6$. By controlling only a subset of the readers, an adversary may increase the probability of such detection failure. For example, by controlling the reader that operates the genuine product at time $t_0$, the adversary would learn the genuine product tail and pointer and could ensure consistency at time $t_1$. For the adversary's clone 420-$i$ now to pass undetected, the adversary would only need the counterfeit tail to be correctly set by chance at time $t_5$. Obviously, many factors (e.g., tail and symbol sizes) impact the probability of such undesired chance events. Thus, tailing in a given embodiment may be structured so as to substantially eliminate the probability of such undesired chance events.

Figure 8:
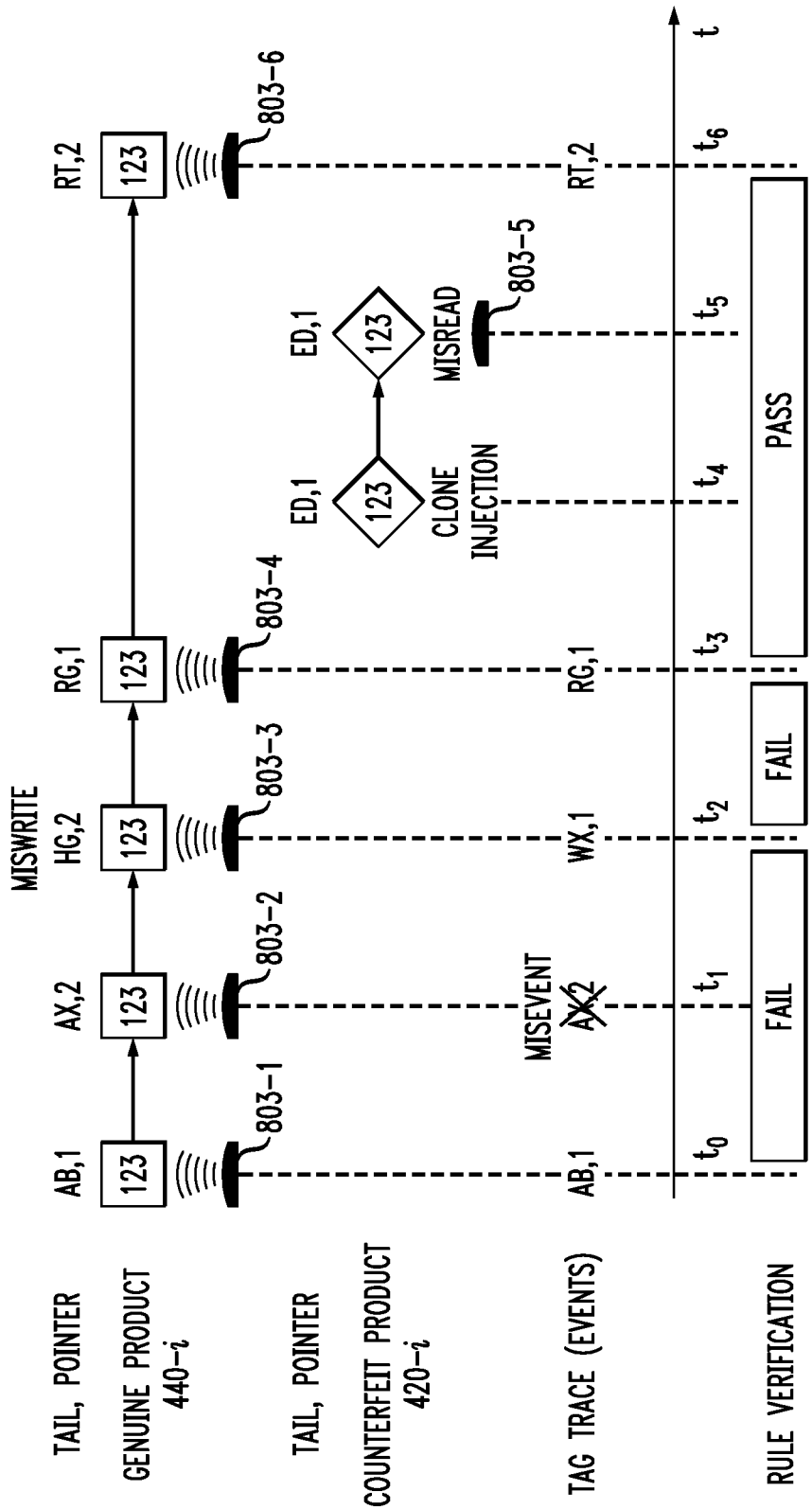
FIG. 8 illustrates a tag trace with a misevent and a misread, according to an embodiment of the invention.

Blind zones and reader errors create fragmentary and erroneous visibility in the supply chain, masking evidence of clone tags or creating inconsistencies in the observed tag paths that lead to false alarms. The causes of fragmentary and erroneous visibility are misevents, misreads and miswrites. A misevent occurs when a relevant event is not available to the detector. Misevents do not obstruct the tailing operation, i.e., the tag memory is correctly modified, but they result in lost events. FIG. 8 illustrates the effect of a misevent and miswrite in a tag trace for a genuine product 440-$i$ and a counterfeit product 420-$i$ as they pass through a supply chain with readers 803-1, 803-2, 803-3, 803-4, 803-5 and 803-6 at times $t_0$, $t_1$, $t_2$, $t_3$, $t_4$, $t_5$, and $t_6$, respectively. Misevents create inconsistencies in tag traces as two reported time-consecutive events would appear as non-consecutive, potentially raising a false alarm as shown in FIG. 8. Misevents may also mask clone evidence, as may misreads.

A misread occurs when a tag passes unnoticed through a reader, so that no tail update or event creation results. As shown in FIG. 8, misreads can lead to missed clones. A miswrite occurs when a tag write operation fails. Miswrites include cases when tags (i) reply with a write failure message (tag memory is not modified); alternatively, they may not report the result of the write operation and may have: (ii) not modified, (iii) correctly modified, or (iv) incorrectly modified (corrupted) the tag memory. When a reader reports a miswrite by flagging an event as unusable using TF, case (iii) is comparable to a misevent, while cases (i) and (ii) are comparable to a misread. As shown in FIG. 8, case (iv) creates tail and pointer inconsistencies that lead to false alarms.

Since tailing relies on purpose-built, artificial information that is independent of the supply chain structure, tailing can reduce the effects of misevents, misreads and miswrites. As described above, tailing does not require any predefined correct or incorrect information such that a product X has to go through locations $L_x$, $L_y$, and $L_z$ at times $t_x$, $t_y$, and $t_z$. Thus, tailing is not affected by extraordinary product flow deviations and changes in the supply chain structure, due, for example, to product recalls, misdeliveries, and partners joining and leaving the chain.

Although blind zones and reader failures (i.e., misevents, misreads and miswrites) negatively impact tailing, implementations of tailing can mitigate the negative effects of misevents, misreads and miswrites (false alarms) with no significant increase in an adversary's success probability. Misevents and misreads are mitigated by hypothesizing missing events between two reported time-consecutive events that present tail and pointer inconsistencies. If there is at least one missing event that would resolve these inconsistencies, the ostensible clone evidence is discarded. Such flexibility is possible because tailing updates the tail and increments the pointer in an ordered sequence, allowing for trace reconstruction. For example, if a pair of events $e_i$ and $e_{i+1}$ having, respectively, (L=A, S=receiving) and (L=B, S=receiving) will not raise a false alarm if an event with (L=A, S=shipping) is assumed to be missing between them. Thus, embodiments can mitigate both misevents and misreads leading to false alarms.

Miswrites are mitigated by specifically reporting write failures through an additional event attribute. A reader that does not receive a correct write response from a tag sets this attribute in the corresponding event indicator. The detector will then ignore the inconsistencies resulting from that event and the succeeding one. Misreads create clone misses that may increase an adversary's success probability. However, even for a high number of misreads, tailing is still able to detect a portion of injected clones. For example, an adversary that compromises 4 out of 5 readers in the clone path presents a success probability of 56% even when half of all events are subject to misreads. While tailing is generally more successfully at detecting clone injection the longer the tag trace (i.e., the number of events in the trace), tailing still allows for clone detection with an acceptable false alarm rate for relatively short tag traces.

The resource costs for a detector are independent of the overall number of tags in a system. Instead, the required storage capacity, computational and accessing effort, and communication costs are linearly dependent on the number n of events in the traces under evaluation. The resource costs thus scale linearly with n.

The tag processing speed (i.e., speed at which tag IDs can be read) is affected by the tailing operation between a tag and reader, which includes (tail and pointer) read and write operations on tag memory. Despite the limited tag-memory requirement of tailing, it reduces the nominal tag processing speed in a EPC C1G2-compliant implementation. Tailing, however may be performed by only a few readers in a supply chain, such as for example only upon product receipt and shipping, thus making tailing a rare operation with little overall processing overhead.

A supply chain S can be modeled as an acyclic, directed graph H=(V,K), in which nodes V represent readers and edges K represent supply chain paths between readers. Products enter the graph or supply chain at a source node and traverse edges along a path $\pi$ until they reach the sinks. A detector $\mathcal{D}$ has limited visibility into the supply chain, corresponding to a subset of readers $V_D \subseteq V$. The sequence of detection-relevant events associated with a genuine product following a path $\pi_G$ with start node $V_{G,m}$ and sink $v_{G,m}$ is defined as $G=(g_0, \ldots, g_m)$. $V_G$ indicates the nodes in $\pi_G$ ($V_G \subseteq V_D$). The sequence of detection-relevant events associated with a clone product following a path $\pi_C$ with start node $v_{C,0}$ and sink $v_{C,n}$ is defined as $C=(c_0, \ldots, c_n)$ and $V_C \subseteq V_D$.

The detector performs event collection at some time $t_D$, triggered by a product reaching its sink. An event trace GC is defined as a time-sorted combination of the sequences G and C at the detection time $t_D$. $g_0$ is the into-the-chain event for the genuine product and therefore the first event of a combination GC is $g_0$. The set of all possible combinations of the sequences G and C is defined as $T_{CG}(G,C)=(GC_0, \ldots, GC_j)$. The set size $|T_{GC}|$ is equal to $$\binom{|G|+|C|+1}{|C|+1} - 1,$$

the combination with repetitions $$\binom{n+k-1}{k}$$

for n=|G|+1, k=|C|+1. Each reader may fail with probability $p_{mv}$ in a tag write operation and with probability $p_{mr}$ in a tag read operation. The detector receives an event in G or C with probability $p_{me}$. $\hat{}$ is defined as the actual event trace received by the detector at detection time $t_D$.

The probability that a trace $\hat{}$ contains no clone evidence according to the detector $\mathcal{D}$ and a given adversary A is defined as $P_{pass}$. $E=(\epsilon_0, \ldots, \epsilon_i)$ denotes clone evidence instances observed under the rule set of Equation 1 based on a tailing operation with tag tail size t (in symbols), tail symbol size s (in bits), and tail pointer size $p=\log_2(t)$. In this instance, i, s and t are distinct from their usage above. The size m of the tag memory dedicated to the detection mechanism is equal to $t \cdot s + \lceil p \rceil$ bits. $P_{pass}$ is thus:

$$P_{pass} = \prod_{i=0}^{|E|-1} P_{\epsilon_i} = \left(\frac{1}{2^{(t+1)\cdot s + p}}\right)^{a_0} \cdot \prod_{i=1}^{|E|-1} \left(\frac{1}{2^{(t-1)\cdot s}}\right)^{a_i b_i} \quad (2)$$

where $P_{\epsilon_i}$ is the probability that clone evidence $\epsilon_i$ passes unnoticed (does not appear). $a_i=0$ when adversary $\mathcal{A}$ cancels out evidence $\epsilon_i$ (otherwise $a_i=0$). $b_i=0$ when the number n of clone or genuine events between evidence $\epsilon_{i-1}$ and $\epsilon_i$ is not a multiple of t (otherwise $b_i=1$). The first term (i=0) captures the probability that a clone is injected with correct tail and pointer values (w.r.t. the genuine product). The second term (i>0) captures the probability that consistent genuine and clone tails (and pointers) remain consistent after a number of tailing operations on one of the two tails (i.e., lack of clone evidence persists).

The probability that a clone is injected by adversary $\mathcal{A}$ into the supply chain at node $v_{C,0} \in V$ is not observed by the detector $\mathcal{D}$ is denoted as $P_{succ}$. This success probability sums over all possible combinations of the sequences of G and C, and may be defined as $$P_{succ} = \sum_{i=0}^{|T_{GC}|-1} P_{GC}(GC_i) \cdot P_{pass}(\hat{G}Ci, \mathcal{A}), \quad (3)$$

where $P_{GC}(GC_i)$ is the probability associated with combination $GC_i$ under probability distribution $P_{GC}$.

An embodiment of tailing which uses 1-bit symbol size s is referred to herein as 1-bit tailing. Different combinations of tail size t and symbol size s may be used in different embodiments. The robustness of 1-bit tailing against misevents, misreads and miswrites is discussed below. Misevents cause inconsistencies in genuine tag traces, which then raise false alarms. Misevents may also cause clone misses. To mitigate the effect of misevents, the set of rules in Equation 1 can be relaxed to accept a number em of missing events between two (reported) time-consecutive events. In this relaxation, a pair of events $e_i$ and $e_{i+1}$ is considered correct for which: (i) the symbols in the tail $TT_{i+1}$ are the same as those in $TT_i$, except for the symbols rewritten between positions $TP_i$ (exclusive) and $TP_{i+1}$ (inclusive), and (ii) the difference between the two tail pointers is at most em plus one (the one corresponding to the pointer increment). Thus, a modified set of rules for evaluating tag traces is as follows:

$$\begin{cases} TT_{i+1}[n] = TT_i[n] & \forall n \backslash (TP_i, TP_{i+1}] \text{ if } \Delta_{TP} > 0 \\ & \forall n \in (TP_{i+1}, TP_i] \text{ if } \Delta_{TP} < 0 \\ \Delta TP(\text{mod}t) \leq me + 1 \end{cases} \quad (4)$$

where n ranges from 1 to tail size t, TT[n] indicates the n-th symbol in the tail TT, and $\Delta_{TP}$ is equal to $(TP_{i+1} - TP_i)$. For $\Delta_{TP} = 0$, the tail has been completely rewritten, which makes the results for the rule verification not reliable. In addition, even for $\Delta_{TP} \neq 0$, it may be possible that the tail has been completely rewritten. To avoid such situations, in some embodiments of tailing the tail size t is larger than $\lceil |G| \cdot p_{me} + 1 \rceil$. Allowing missing events may have the side effect of increasing the adversary's success probability.

Misreads may mask clone events and cause the detector to miss clones. Even a small misread probability $p_{mr}$ can increase an adversary's success probability.

Miswrites include cases when tags (i) reply with a write failure message (no memory modification), they also include cases when tags do not acknowledge a failed write operation and have (ii) not modified, (iii) correctly modified, or (iv) incorrectly modified (corrupted) the tag memory. If miswrites are reported through the tailing flag TF, cases (i) and (ii) are comparable to misreads, which cause missed clones, but case (iii) is like a misevent. To mitigate the effect of memory corruption, i.e., case (iv), event indicators can include a miswrite flag (TMF). A reader not receiving any write operation result from a tag will set both the tailing and the miswrite flags in an event $e_i$; the detector will then ignore clone evidence between events $e_i$ and $e_{i+1}$. Although the miswrite flag could be misused by an adversary to mark clone events as miswrites, this provides no advantage in terms of $P_{succ}$ over blocking clone events. In fact, misusing the miswrite flag only cancels out clone evidence resulting from a clone event followed by a genuine event, but not vice versa; blocking can cancel both. Injecting fake events may suspiciously increase the number of events in a trace, though, while misuse of the miswrite flag does not.

In a supply chain from the product manufacturer to one or more distributors and one or more retailers, there are several injection points at which counterfeit goods may enter the supply chain. For example, injection points may be found between manufacturers and distributors, between one distributor and another distributor, and between distributors and retailers. Clone detection may be performed when products leave the supply chain. A product flow is defined by the supply chain structure, product demand, and lead times (the stocking time within a partner, the shipping time from a partner, and the transport time between two partners). One or more of the partners has RFID readers that record events as event indicators and may perform tailing. In one embodiment of tailing, tags are EPC C1G2 tags, which operate on 16-bit data blocks, with tail and symbol sizes of 12 symbols and 1 bit respectively allowing use of just one block for tailing.

Detection depends on the number |E| of instances of suspected clone evidence in a given trace, i.e., pairs of time-consecutive events that fail rule verification. Cloning is suspected in some embodiments if |E|≥DT for a parameterized detection threshold DT. A trace contains all events for genuine and clone products with a given ID until one such product reaches a point-of-sale or exit-the-chain event. The second product to reach a point-of-sale eventually triggers an alarm under the basic alert-list mechanism described above.

Figure 9:
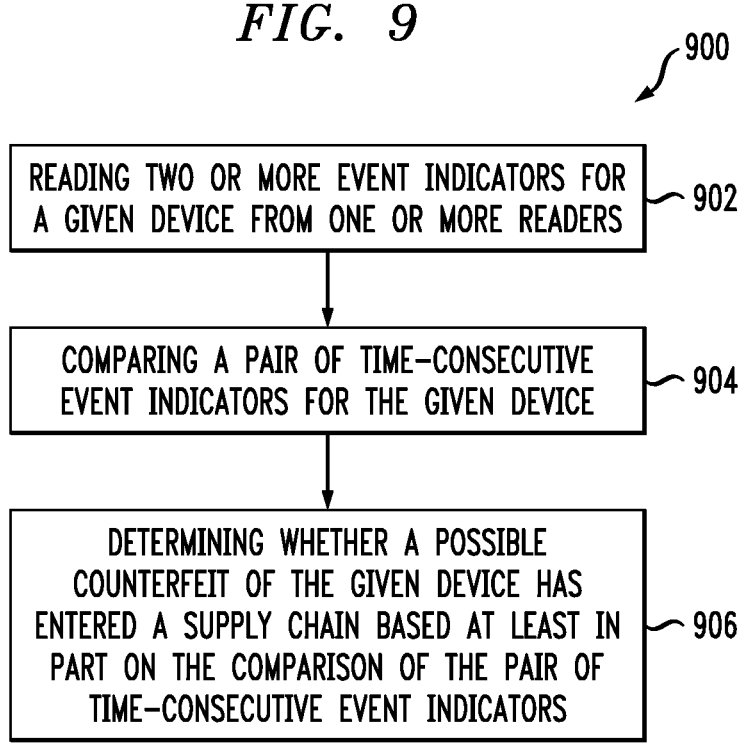
FIG. 9 illustrates a methodology of tag verification, according to an embodiment of the invention.

FIG. 9 illustrates a methodology 900 for tag verification. In step 902, two or more event indicators for a given device are read from one or more readers. Next, a pair of time-consecutive event indicators for the given device is compared 904. The comparison may use one of the rule sets described above. In step 906, a determination is made as to whether a possible counterfeit of the given device has entered a supply chain based at least in part on the comparison of the pair of time-consecutive event indicators.

Embodiments of 1-bit tailing with em=0 and when the miswrite flag TMF is not used are referred to herein as basic 1-bit tailing. Embodiments of 1-bit tailing are referred to as robust 1-bit tailing when em=3 and the flag TMF is used. Robust 1-bit tailing generally achieves better clone detection performance than that of basic 1-bit tailing. For example, basic 1-bit tailing is more sensitive to inconsistencies generated by miswrites and misevents than robust 1-bit tailing. 1-bit tailing may detect a cloned ID when direct clone evidence is effaced by misreads, but this sensitivity can yield higher false alarm rates than robust 1-bit tailing with an approximately equal true positive rate TPR. Generally, a small DT leads to better TPR and false positive rate FPR clone detection.

Stocking and transport times generally do not impact the false alarm rate, though when the transport time is greater than the stocking time, detection rate may decrease. Under such a condition, a counterfeit product injected at a retailer can emerge or exit the chain before the genuine product reaches a second level partner which interacts with one or more retailers.

The supply chain structure has a limited impact on false alarm and detection rates when DT=1, but may have a larger impact for DT>1. The main determinant of the detection rate is the average length of the paths traversed by products. Supply chains with longer paths generate more clone evidence than those with shorter paths. Counterfeit goods are generally harder to detect when injected toward the end of a supply chain since they traverse fewer partners. Detection and false alarm rates, however, are invariant to the rate of injection/production of counterfeit goods.

In an embodiment which uses robust 1-bit tailing and EPC C1G2 tags, an RFID reader must read the entire tag tail and tail pointer from tag memory and write an updated pointer and a new symbol. A single EPC C1G2 write operation operates on a data block of 16 bits, while a single read operation operates on up to 128 bits. In a minimal configuration of 8 bits for the tail and pointer, a tailing operation requires only a single read and a single write operation.

Tailing consumes little memory, even by the standards of low-cost tags, e.g., 8 bits. A local database uses storage equal to the number of events generated by a reader or readers. Each event indicator, however, may include additional tail-related attributes such as TF and TMF, which increases storage requirements for the local database. Embodiments of tailing do not require tags to perform computation, while readers perform only lightweight operations, e.g., pseudo-random or random number generation for bit updates. A detector performs rule evaluation on each pair of time-consecutive events, a form of basic complex-event-processing (CEP) that imposes little computational overhead. Tailing requires readers to perform extra write operations. Apart from storage overhead for events, however, tailing carries no extra cost on back-end communication between local databases and a detector.

Tailing does affect tag processing speed. The EPC C1G2 standard requires a nominal tag processing speed for inventory operations (reads) of 24.8 to 1687 tags/s, depending on several parameters (e.g., the tag data rate, encoding scheme, and data modulation). Tailing requires writing into tag memory, currently a time-intensive operation. The EPC C1G2 standard allows a write time up to 20 ms for a single 16-bit memory block. With an 8-bit dedicated memory, writing a new tail bit and updating the tag pointer (4 bits in total) would require writing an entire memory block, resulting in a nominal tag processing speed of 9.6/44.5 tags/s. Commercial tags, however, outperform EPC specifications, e.g., the Impinj Monza 5 chip supports a write speed of approximately 2.5 ms, potentially boosting processing speed to 12/335 tags/s. As discussed above, however, tailing need not be performed by every reader in a supply chain. Instead, embodiments of tailing may be performed only for certain events, such as product receipt or shipping.

Embodiments of the invention can combine tailing with other techniques for clone detection. For example, tailing may be performed by only a few readers in a supply chain, and various other techniques may be used at other readers or the same readers in a supply chain. Such other techniques include, for example, physical-layer fingerprinting techniques, authentication based on low-cost primitives or cryptographic ones, and Phsyical Unclonable Functions (PUFs). PUFs are low-complexity (hundreds of gates), purpose-built circuits that exploit manufacturing variations for authentication. EPC C1G2 tags can be fingerprinted with high accuracy over the air at the physical layer, without added tag hardware. Such fingerprinting is sensitive to environmental factors, though, limiting its use in supply chain scenarios. Low-cost authentication protocols may also be used. The use of native EPC C1G2 storage and access control can similarly be used in conjunction with tailing. Tailing may also be used in conjunction with symmetric- and public-key cryptography is some embodiments.

It is to be appreciated that the particular configuration, elements and operating parameters of the embodiments described above are not requirements of the invention, and should not be construed as limiting the scope of the invention in any way.

For example, the system elements and their configuration as shown in the FIGS. 1-8 may be varied in alternative embodiments. Similarly, the flow diagram of FIG. 9 may include other steps not explicitly shown, as well as different ordering of steps. By way of example, while embodiments of the invention are described above in the context of a supply chain, embodiments are not limited solely to use within a supply chain. Embodiments of the invention may also be used to detect cloning of post-supply chain goods carried by consumers, such as luxury goods like cell phones or RFID-enabled payment devices and travel documents. As another example, in some embodiments tailing may supplement cryptographic or other anti-cloning protections. Those skilled in the art can make these and other modifications in the described embodiments in a straightforward manner.

These and numerous other alternative embodiments within the scope of the appended claims will be readily apparent to those skilled in the art.

What is claimed is:

1. An apparatus comprising:
    a transceiver;
    a memory; and
    a processor coupled to the memory, the processor being configured to:
        obtain an identifier and a first set of values from a device via the transceiver;
        determine a second set of values, the second set of values being based at least in part on the first set of values and a probabilistic function;
        transmit the second set of values to the device via the transceiver; and
        create an event indicator associated with the identifier in the memory, the event indicator comprising at least a portion of the first set of values;
    wherein the event indicator is utilizable for identifying evidence of cloning of the device.

2. The apparatus of claim 1, wherein the transceiver, memory and processor form a radio frequency identification (RFID) reader.

3. The apparatus of claim 1, wherein the device comprises a radio frequency identification (RFID) tag.

4. The apparatus of claim 1, wherein the RFID tag is an electronic product code (EPC) tag.

5. The apparatus of claim 1, wherein the first set of values comprises a sequence of random values and a pointer value indicating a most recently modified set of the sequence of random values.

6. The apparatus of claim 5, wherein the most recently modified set of the sequence of values comprises a single one of the sequence of random values.

7. The apparatus of claim 5, wherein the step of determining the second set of values comprises:
    modifying a given set of the sequence of random values in the first set of values; and
    incrementing the pointer value.

8. The apparatus of claim 7, wherein each of the random sequence of values has a position, and the given set, of the random sequence of values is in a next position relative to a position of the most recently modified set of the random sequence of values.

9. The apparatus of claim 1, wherein the event indicator further comprises a flag value indicative of whether an event is usable for performing a trace of the device.

10. The apparatus of claim 1, wherein each of the first value and the second value is 8 bits in length.

11. The apparatus of claim 1, wherein the event indicator further comprises a time value indicative of a time in which the processor reads the identifier and first set of values from the device, a location value indicative of a location of the apparatus, and a process value indicative of a process performed at the location and the time.

12. The apparatus of claim 11, wherein the process performed at the location and the time is at least one of an into-a-chain event, a receiving event, a stocking event, a shipping event, and an out-of-the-chain event.

13. The apparatus of claim 1, wherein the processor is further configured to verify that the second set of values was written to a memory of the device.

14. An apparatus comprising:
    interface circuitry;
    a memory; and
    a processor coupled to the memory, the processor being configured to:
        store an identifier and a first set of values in the memory;
        receive a second set of values from a reader; and
        write the second set of values to the memory;
    wherein the second set of values is determined based at least in part on the first set of values and a probabilistic function;
    wherein at least a portion of the first set of values is used to create an event indicator associated with the identifier; and
    wherein the event indicator is utilizable for identifying evidence of cloning of the apparatus.

15. The apparatus of claim 14, wherein the first set of values comprises a sequence of random values and a pointer value indicating a most recently modified set of the sequence of random values.

16. The apparatus of claim 14, wherein the second set of values is determined by modifying a given set of the sequence of random values in the first set of values and incrementing the pointer value.

17. A method comprising the steps of:
    obtaining an identifier and a first set of values from a given device;
    determining a second set of values, the second set of values being based at least in part on the first set of values and a probabilistic function;
    transmitting the second set of values to the given device; and
    creating an event indicator associated with the identifier, the event indicator comprising at least a portion of the first set of values;
    wherein the event indicator is utilizable for identifying evidence of cloning of the given device.

18. The method of claim 17, further comprising the step of repeating the obtaining, determining, transmitting and storing steps.

19. The method of claim 18, further comprising the steps of:
    comparing a pair of time-consecutive event indicators associated with a given identifier; and
    determining whether a possible counterfeit of the given device has entered a supply chain based at least in part on the comparison of the pair of time-consecutive event indicators;
    wherein each of the two or more event indicators comprises a set of values.

20. The method of claim 19, wherein each of the sets of values comprises a sequence of random values and a pointer indicative of a most recently modified set of the sequence of random values.

21. The method of claim 20, wherein each of the random sequence of values has a position, the pointer indicates the most recently modified set of positions in the sequence of random values, and the comparing step comprises determining whether the random sequence of values in the first event indicator in the pair of event indicators is the same as the random sequence of values in the second event indicator in the pair of event indicators, except in the positions indicated in the pointer of the second event indicator.

22. The method of claim 19, wherein each of the event indicators further comprises a flag value indicative of whether an event is usable for performing a trace of the given device; and wherein when the flag value indicates that an event is not usable for performing a trace of the given device, ignoring said event indicator when performing said comparing and determining steps.

23. A non-transitory processor-readable storage medium having instruction code embodied therein which when executed by a processor implements the steps of the method of claim 17.

24. A method comprising the steps of:
    storing an identified and a first set of values in a memory of a device;
    receiving a second set of values from a reader; and
    writing the second set of values to the memory;
    wherein the second set of values is determined based at least in part on the first set of values and a probabilistic function;
    wherein at least a portion of the first set of values is used to create an event indicator associated with the identifier; and
    wherein the event indicator is utilizable for identifying evidence of cloning of the device.

25. A non-transitory processor-readable storage medium having instruction code embodied therein which when executed by a processor implements the steps of the method of claim 24.

* * * * *

UNITED STATES PATENT AND TRADEMARK OFFICE
CERTIFICATE OF CORRECTION

PATENT NO. : 8,994,514 B1
APPLICATION NO. : 13/720003
DATED : March 31, 2015
INVENTOR(S) : Ari Juels et al.

Page 1 of 1

It is certified that error appears in the above-identified patent and that said Letters Patent is hereby corrected as shown below:

In the specification:

Column 10, line 23, please change "go" to -- $g_0$ --

Column 10, line 40, please change "$p_{mv}$" to -- $p_{mw}$ --

Column 10, line 42, please change ""^"" to -- $\hat{GC}$ --

Column 10, line 44, please change ""^"" to -- $\hat{GC}$ --

In the claims:

Claim 4, column 14, line 46, please change "claim 1" to -- claim 3 --

Claim 8, column 14, line 61, after "set" please delete ","

Claim 16, column 15, line 36, please change "claim 14" to -- claim 15 --

Claim 18, column 15, lines 54-55, please change "storing steps" to -- creating steps --

Signed and Sealed this
Twenty-fifth Day of August, 2015

Michelle K. Lee
*Director of the United States Patent and Trademark Office*